(12) United States Patent
Bragg (10) Patent No.: US 9,106,524 B2
(45) Date of Patent: Aug. 11, 2015

(54) PROTECTION FOR PROVIDER BACKBONE BRIDGE TRAFFIC ENGINEERING

(75) Inventor: Nigel Lawrence Bragg, Weston Colville (GB)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 229 days.

(21) Appl. No.: 13/044,905

(22) Filed: Mar. 10, 2011

(65) Prior Publication Data

US 2011/0164493 A1 Jul. 7, 2011

Related U.S. Application Data

(63) Continuation of application No. PCT/US2009/048142, filed on Jun. 22, 2009.

(60) Provisional application No. 61/096,011, filed on Sep. 11, 2008.

(51) Int. Cl.
*H04L 12/28* (2006.01)
*H04L 12/24* (2006.01)
(Continued)

(52) U.S. Cl.
CPC ........ *H04L 41/0663* (2013.01); *H04L 12/4625* (2013.01); *H04L 45/22* (2013.01); *H04L 45/28* (2013.01); *H04L 43/0817* (2013.01); *H04L 43/10* (2013.01)

(58) Field of Classification Search
CPC ..... H04L 12/4662; H04L 45/00; H04L 45/28; H04L 47/728; H04L 47/746; H04L 49/557; H04L 45/02
USPC .......... 370/217, 225, 392, 252, 244, 235, 389
See application file for complete search history.

(56) References Cited

U.S. PATENT DOCUMENTS

2002/0167898 A1 11/2002 Thang et al.
2007/0076719 A1* 4/2007 Allan et al. .................. 370/392
(Continued)

FOREIGN PATENT DOCUMENTS

| CN | 1615612 A | 5/2005 |
| CN | 1983995 A | 6/2007 |

(Continued)

OTHER PUBLICATIONS

Supplementary European Search Report, Reference No. EPP6772, Nov. 9, 2011. Application No. EP09813399.
(Continued)

*Primary Examiner* — Andrew Lai
*Assistant Examiner* — Jamaal Henson
(74) *Attorney, Agent, or Firm* — Anderson Gorecki & Rouille LLP (57) ABSTRACT

Network protection between endpoints includes both end-to-end and local section protection. A primary path between the endpoints includes a plurality of links, and is protected on an end-to-end basis by a protection path associated with different links. At least one sections of the primary path is also protected on a local basis, where a "section" is a link, ring, trunk or other portion of a network. One or more sections of the protection path may also be protected on a local basis. In response to detection of a fault condition, section protection is utilized to overcome the fault if possible, and otherwise end-to-end protection is utilized. Invoking section protection does not imply a switchover from the primary end-to-end path to the protection end-to-end path. Rather, the primary end-to-end path is rerouted in the affected section.

16 Claims, 10 Drawing Sheets

(51) Int. Cl.
*H04L 12/46* (2006.01)
*H04L 12/707* (2013.01)
*H04L 12/703* (2013.01)
*H04L 12/26* (2006.01)

(56) References Cited

U.S. PATENT DOCUMENTS

| | | | |
|---|---|---|---|
| 2008/0095047 A1* | 4/2008 | Skalecki et al. | 370/225 |
| 2009/0073988 A1* | 3/2009 | Ghodrat et al. | 370/395.53 |
| 2009/0129772 A1* | 5/2009 | Trudel et al. | 398/8 |
| 2010/0208593 A1* | 8/2010 | Soon et al. | 370/242 |
| 2011/0026397 A1* | 2/2011 | Saltsidis et al. | 370/228 |

FOREIGN PATENT DOCUMENTS

| | | |
|---|---|---|
| WO | WO 02/069104 A2 | 6/2002 |
| WO | WO02/069104 A2 | 9/2002 |
| WO | WO 02069104 A2 * | 9/2002 |

OTHER PUBLICATIONS

International Search Report, Republic of China, received Feb. 19, 2013, pp. 1-10.

* cited by examiner

PROTECTION FOR PROVIDER BACKBONE BRIDGE TRAFFIC ENGINEERING

CROSS REFERENCE TO RELATED APPLICATIONS

This application is a continuation of International Application Number PCT/US2009/048142, titled PROTECTION FOR PROVIDER BACKBONE BRIDGE TRAFFIC ENGINEERING, International Filing Date 22 Jun. 2009, which claims priority to U.S. Provisional Patent Application 61/096,011, filed 11 Sep. 2008.

FIELD OF THE INVENTION

This invention is generally related to network communications, and more particularly to protection for provider backbone bridge traffic engineering.

BACKGROUND OF THE INVENTION

Figure 1:
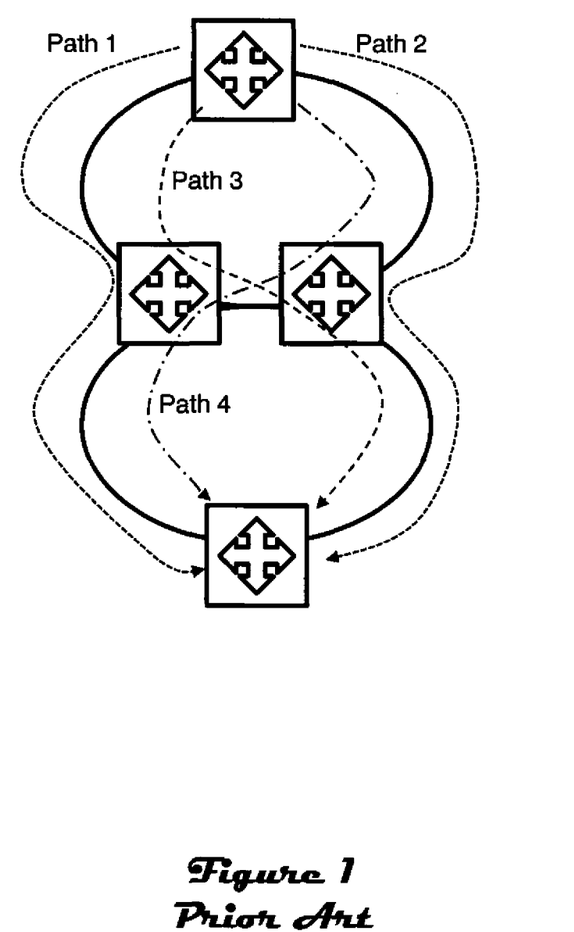
FIG. 1 illustrates an end-to-end 1:1 protection paradigm.

Provider Backbone Bridge Traffic Engineering ("PBB-TE") uses an end-to-end 1:1 protection paradigm, referred to in this document as "e2e protection". This provides a robust protection mechanism which can be used across an arbitrary mesh of network connectivity. However, the underlying physical connectivity of many networks frequently uses rings of fiber, which makes protection over ring topologies an important scenario. In a network of cascaded rings as illustrated in FIG. 1, matched pairs of nodes are used to interconnect communication links of logically adjacent rings. A primary path between endpoints traverses links between ones of the matched pairs of nodes, i.e., primary path nodes. A protection path traverses different links between the corresponding nodes of the matched pairs of nodes, i.e., protection path nodes. Each path in PBB-TE is associated with a VLAN ID (VID). In the event of a fault in a link or node of the primary path, traffic is switched to the protection path by the headend endpoint changing the VID used on data frames.

Although the end-to-end 1:1 protection paradigm works well, it has some drawbacks. For example, different rings may be associated with different geographic domains that are managed and operated by different organizations within the carrier, and each organization may wish to schedule maintenance outages without coordinating with other organizations. Further, in long distance communication deployments, the frequency of faults on the extended e2e path can become significant enough that probability of a second fault occurring on the protection path before a first fault is repaired becomes unacceptable. An extended e2e protection paradigm can be used to mitigate this, but the number of required protection paths grows significantly as a function of the number of rings and extent of protection, e.g., protection from multiple faults across multiple rings. For example, four end-to-end paths are required for decoupling of a pair of rings in cascade since there are four possible paths. In the case of three rings in cascade, six paths are required for protection against two independent faults on any pair of rings, and eight paths are required for full protection against a single simultaneous fault on each ring. Maintaining a large number of paths can be problematic because forwarding state is directly related to the number of paths installed, and every path adds a Connectivity Fault Management ("CFM") session to the terminating nodes.

SUMMARY OF THE INVENTION

In accordance with an embodiment of the present invention, a method for providing protection in a provider bridge backbone network comprises: in response to a fault, utilizing section protection if possible, where a section is defined between an ingress point and an egress point that do not span the entire provider bridge backbone network; and utilizing end-to-end protection if the fault cannot be overcome with section protection.

In accordance with another embodiment of the present invention, apparatus for communicating between endpoints using a provider bridge backbone network comprises: an ingress point node and an egress point node which operate together to provide protection for a section of the network between the ingress point node and the egress point node, where the section does not span the entire provider bridge backbone network, the network operating in response to a fault to utilize the section protection if possible, and to utilize end-to-end protection between the endpoints if the fault cannot be overcome with section protection.

Advantages associated with the invention include more efficient use of network resources and enhanced protection. Although the multiplicity of paths required for comprehensive protection each require forwarding state to be installed in nodes to dictate the path to be taken by traffic, data traffic only travels on one end-to-end path at any time according to the 1:1 "head-end switching" model used by PBB-TE. This overcomes the inefficient use of network resources of previous 1+1 embodiments of section protection, which have also previously made uneconomic the deployment of section protection in combination with end-to-end path protection. Further, by utilizing section protection for the primary and protection end-to-end paths it is possible to tolerate one failure per ring, including the case of failure of one matched node (which faults two rings), while only doubling of the amount of state information stored at matched nodes. However, it should be understood that the invention is not limited to ring architectures.

These and other advantages of the invention will be more apparent from the detailed description and the drawing.

DETAILED DESCRIPTION

Data communication networks may include various computers, servers, nodes, routers, switches, bridges, hubs, proxies, and other network devices coupled to and configured to pass data to one another. These devices will be referred to herein as "nodes." Data is communicated through the data communication network by passing protocol data units, such as Internet Protocol packets, Ethernet Frames, data cells, sections, or other logical associations of data, between the nodes by utilizing one or more communication links between the nodes. A particular protocol data unit may be handled by multiple nodes and cross multiple communication links as it travels between its source and its destination over the network.

The particulars described herein are for purposes of describing the illustrated embodiments of the present invention to provide what is believed to be a useful and readily understood description of principles and conceptual aspects of the invention. No attempt is made to show structural aspects of the invention in more detail than is necessary for a fundamental understanding of the invention.

Figure 2:
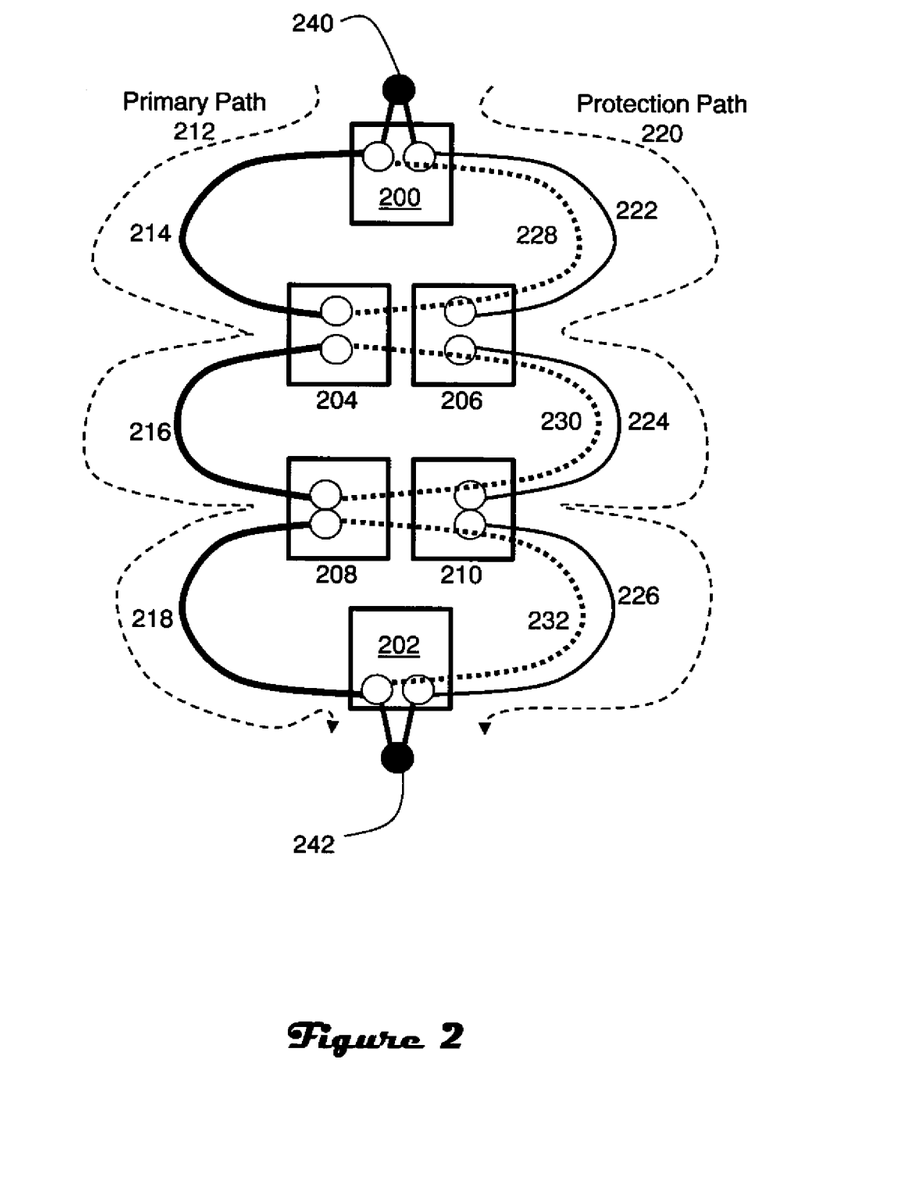
FIG. 2 illustrates a paradigm with end-to-end protection, and section protection applied to the primary path only.

FIG. 2 illustrates a protection paradigm with both end-to-end and section protection in the context of two endpoint nodes 200, 202 connected via three cascaded rings which are interconnected by matched pairs of nodes (204, 206), (208, 210). A primary path 212 associated with links 214, 216, 218 is protected on an end-to-end basis by protection path 220 associated with links 222, 224, 226. One or more sections of the primary path are also protected on a local basis, where a "section" is a link, ring, trunk or other portion of a network. For example, link 214 may be protected by path 228 via link 222, link 216 may be protected by path 230 via link 224, and link 218 may be protected by path 232 via link 226. The fault status of each of the paths through a section is independently monitored by a CFM session between the section endpoints. In response to detection of a fault condition, section protection is utilized to overcome the fault if possible, and otherwise end-to-end protection is utilized. For example, the timeout period before a fault is indicated by end-to-end CFM sessions may be set to be longer than the corresponding section timeout period so that unnecessary end-to-end protection switches are not triggered. Note that invoking section protection does not imply a switchover from the primary e2e path to the protection e2e path. Rather, the primary e2e path is rerouted in the affected section only. Consequently, at least some of the problems associated with the end-to-end 1:1 protection paradigm can be mitigated. Although FIG. 2 specifically illustrates rings, the section protection mechanism described here may be employed over any topology, with the single constraint that the two paths forming the protected section must not cross between protection opening and closure.

It must be understood that although the multiplicity of paths required for comprehensive protection each require forwarding state to be installed in nodes to dictate the path to be taken by traffic, the 1:1 "head-end switching" model used by PBB-TE means that traffic only ever travels on one end-to-end path at any time. This overcomes the inefficient use of network resources of previous 1+1 embodiments of section protection, which have also previously made uneconomic the deployment of section protection in combination with end-to-end path protection.

Protection for a given section may be closed on a single matched node, or corresponding nodes at the ingress and egress of the section. For example, primary link 214 and the corresponding protection path 228 carried via link 222 are closed on node 204, which is matched with node 206. Consequently, a fault in link 214 can be overcome by utilizing link 228 for section protection without switching away from node 204, or needing active involvement by node 206 in the switchover process. In the less likely event of a fault of node 204, end-to-end protection would be invoked as a consequence of failure of the primary end-to-end CFM session over path 212, and traffic would be switched to the links and nodes associated with protection path 220, including using node 206 rather than node 204. This advantageously mitigates problems associated with protection synchronization between matched nodes.

Figure 3:
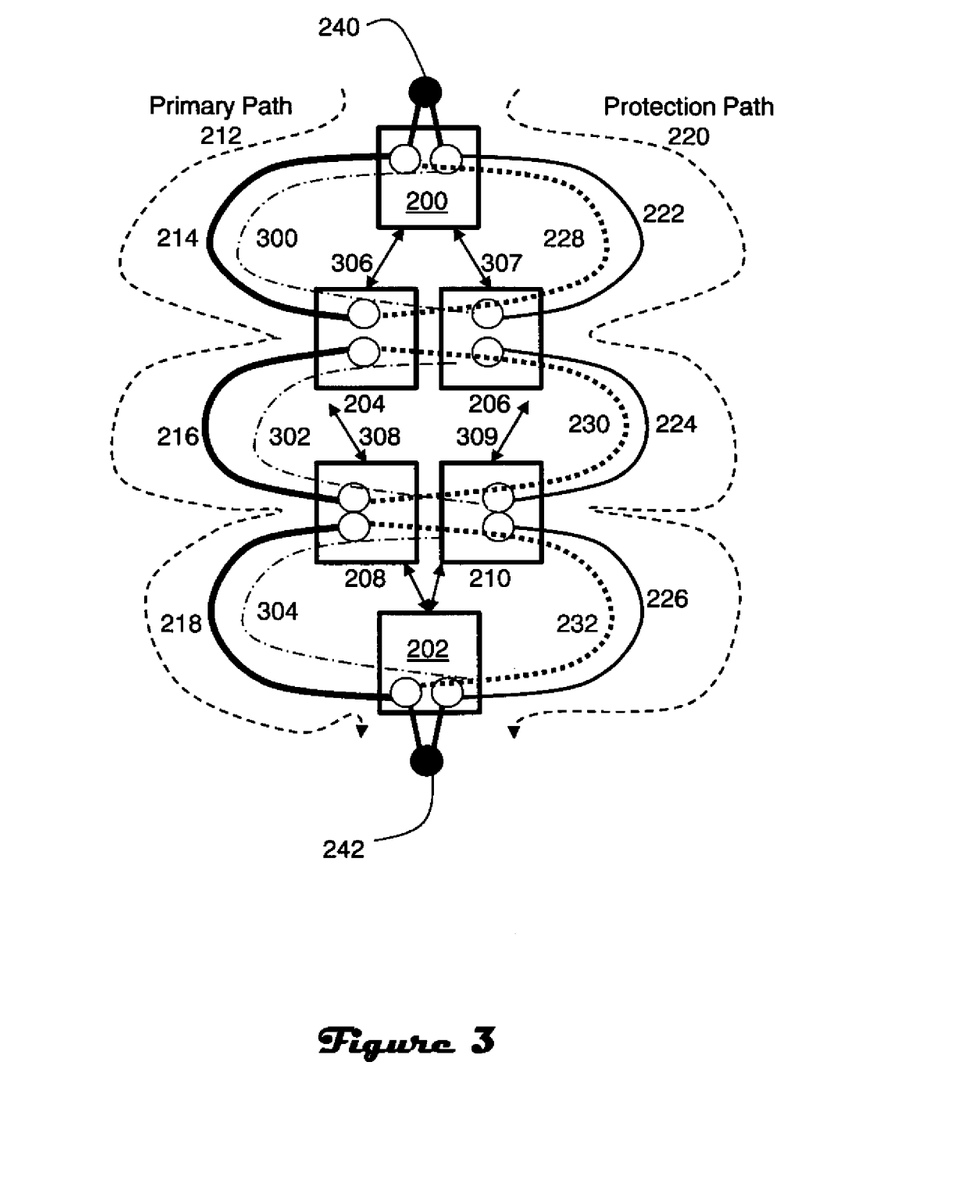
FIG. 3 illustrates section protection for both the primary and protection paths.

Referring to FIG. 3, in one embodiment both the primary and protection paths are provided with section protection. More particularly, in addition to the paths and links described with regard to FIG. 2, link 222 is protected by path 300 via link 214, link 224 is protected by path 302 via link 216, and link 226 is protected by path 304 via link 218. Protection for each section is independently opened and closed on both the primary and protection paths. CFM Connectivity Check sessions are maintained for the primary and protection paths between the endpoints 240, 242 to continuously determine the status of the two end-to-end paths. Two CFM sessions 306 (one clockwise, the other counter-clockwise) determine the status of the two paths between nodes 200 and 204 using the VID used by the primary e2e path, and two further CFM sessions 307 determine the status of the two paths between nodes 200 and 206 using the VID used by the protection e2e path. Two CFM sessions 308 determine the status of the two paths between nodes 204 and 208 using the VID used by the primary e2e path, and two further CFM sessions 309 determine the status of the two paths between nodes 206 and 210 using the VID used by the protection e2e path. Individual section protection CFM sessions need not be created for every end-to-end path. For example, the two sessions 308 could be used for all routes entering and leaving the middle ring via nodes 204 and 208. By utilizing section protection for the primary and protection paths it is possible to tolerate one failure per ring, including the case of failure of one matched node (which faults two rings), while only doubling of the amount of state information stored at matched nodes.

Figure 4:
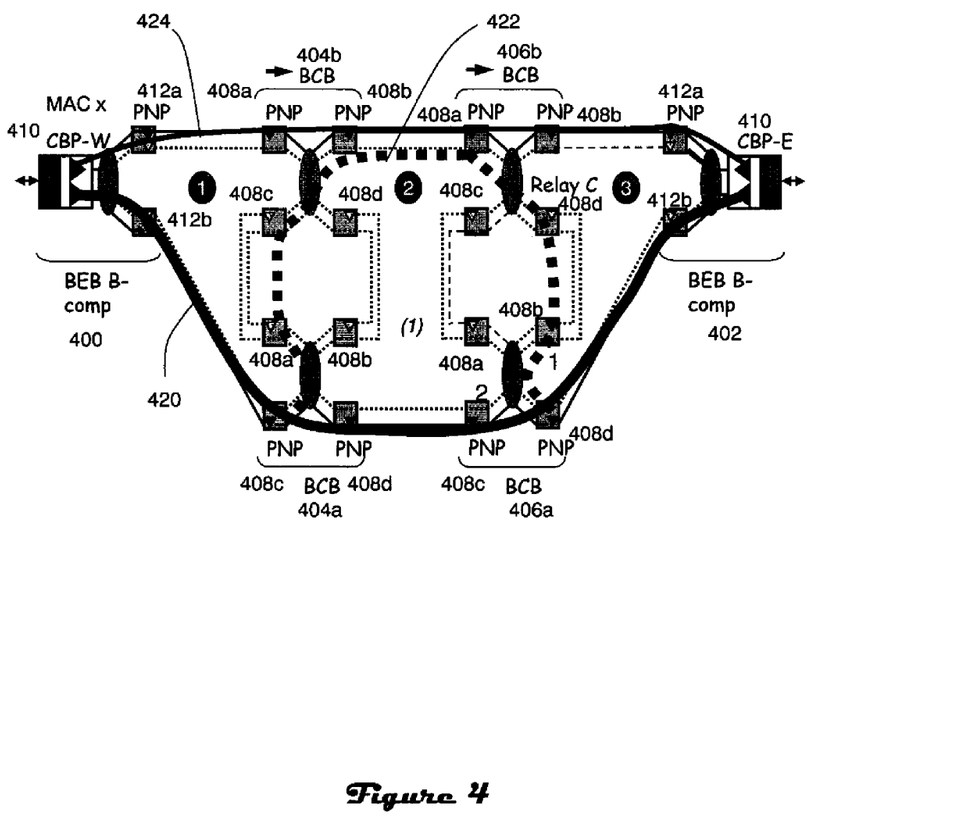
FIG. 4 illustrates an embodiment of the invention that will be used as a basis for describing responses to various different fault conditions shown in FIGS. 5 through 10.

FIG. 4 illustrates an embodiment of the invention that will be used as a basis for describing responses to various different fault conditions shown in FIGS. 5 through 10. With no loss of generality, the effect is illustrated in all cases for traffic flowing from left to right only, and "upstream" and "downstream" are used with respect to that direction of flow. As shown in FIG. 4, backbone edge bridges (BEBs) 400, 402 are in communication via rings. The rings interface at matched pairs of backbone core bridges (BCBs) 404a, 404b, 406a, 406b. Each BCB includes four provider network ports (PNPs), for example 408a, 408b, 408c, 408d. Each BEB includes a customer backbone port (CBP) 410 and two PNPs 412a, 412b. A primary path 420 between the BEBs is protected by an e2e protection path 424 and a section protection path 422 between BCBs 404a and 406b. Section protection for the e2e protection path is not shown in order to provide a clearer figure. In order to detect faults and trigger protection switching, CFM sessions are maintained between the following pairs: (BEB 400, BCB 404b); (BEB 400, BCB 404a); (BCB 404b, BCB 406b); (BCB 404a, BCB 406a); (BCB 406b, BEB 402); and (BCB 406a, BEB 402).

Figure 5:
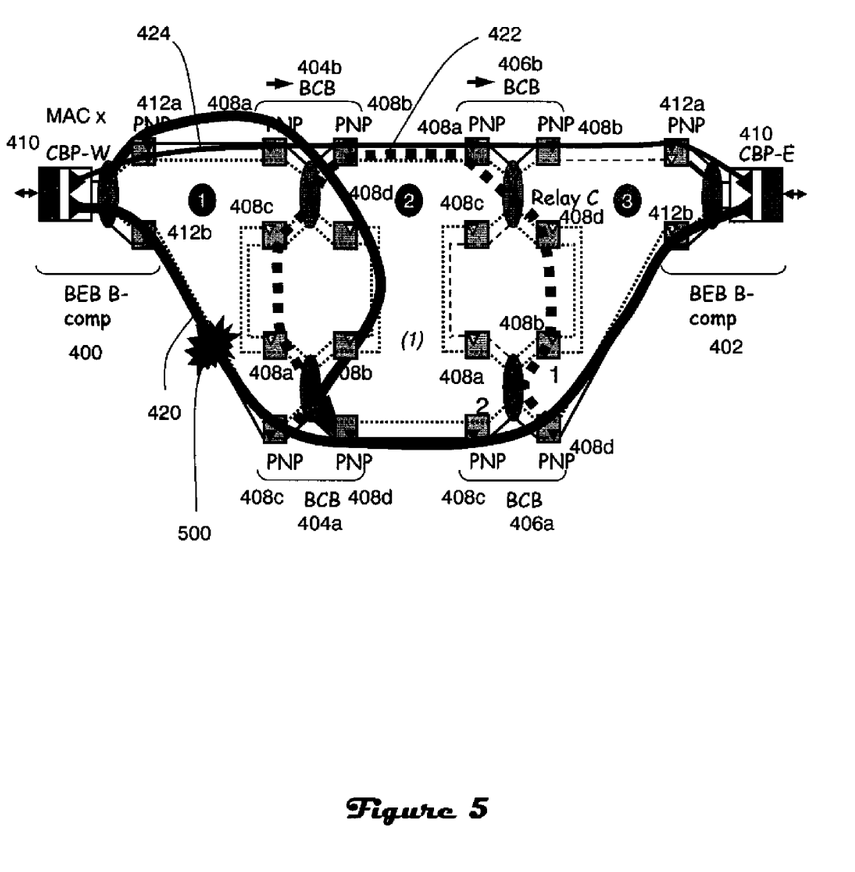
FIG. 5 illustrates an upstream failure in the primary route.

FIG. 5 illustrates a fault 500 in the primary path 420 which is upstream of BCB 404a. In response to the failure detected by the failure of the (BEB 400, BCB 404a) CFM session, traffic is rerouted by BEB 400 through PNP 412a to BCB 404b and then to BCB 404a, along the section protection path for 420 along the first section. BCB 404a returns the rerouted traffic to the primary path 420 at PNP 408d.

Figure 6:
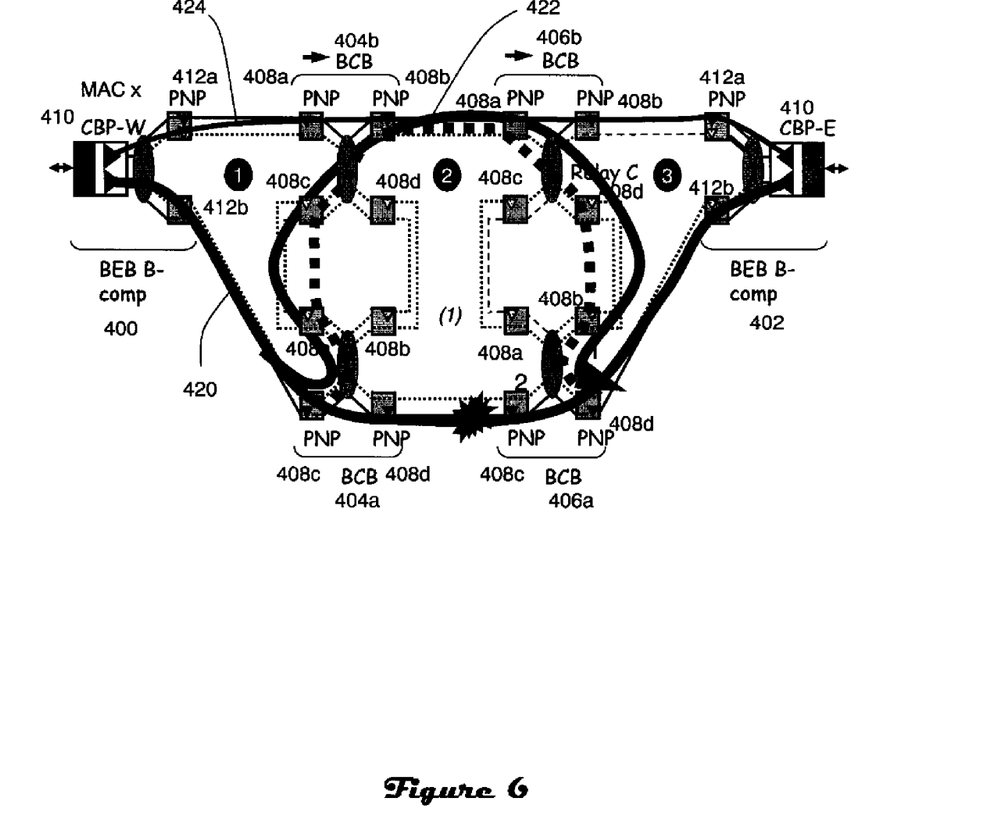
FIG. 6 illustrates a downstream failure in the primary route.

FIG. 6 illustrates a failure in the primary route downstream of BCB 404a. In response to this failure condition traffic is rerouted via the section protection for the second section. More particularly, BCB 404a reroutes traffic received at its PNP 408c via which the traffic proceeds to BCB 404b and BCB 406b. BCB 406b forwards the traffic to BCB 406a, which returns the rerouted traffic to the primary path at its PNP 408*d*. The rerouted frames are not altered in any way at the protection opening point BCB 404*a*; they can and do use the same VID value (that associated with the primary e2e path).

Figure 7:
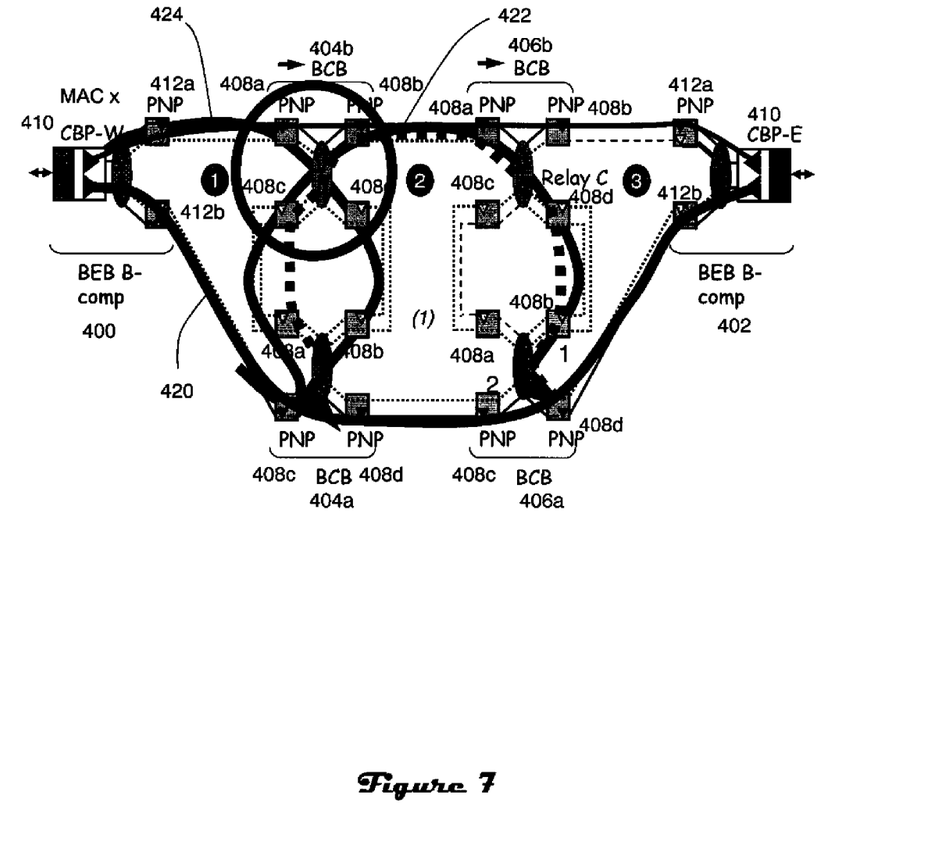
FIG. 7 illustrates how the responses shown in FIGS. 5 and 6 potentially conflict under the requirement for a single Forwarding Database per bridge.

FIG. 7 illustrates how the responses shown in FIGS. 5 and 6 require that the BCB matched node 404*b* has two forwarding paths for section protection of the primary e2e path which are used under different circumstances. Although the two paths cannot be active simultaneously, BCB 404*b* has no direct means of determining which path will be used and when, and it is advantageous in terms of state and complexity to maintain this lack of active involvement. Simultaneous installation of both of these forwarding paths potentially represents a conflict. In particular, different routes are associated with the same address (that of endpoint BEB 402) at BCB 404*b*. This is a problem because the BCB typically has only one forwarding database (FDB). One straightforward solution to this problem is to have a different forwarding database at each PNP. However, that is contrary to the Ethernet bridging standards IEEE 802.1Q and IEEE 802.1ah, in which the FDB is applicable to all bridge ports, which is problematic if it is desired to comply with those standards.

Figure 8:
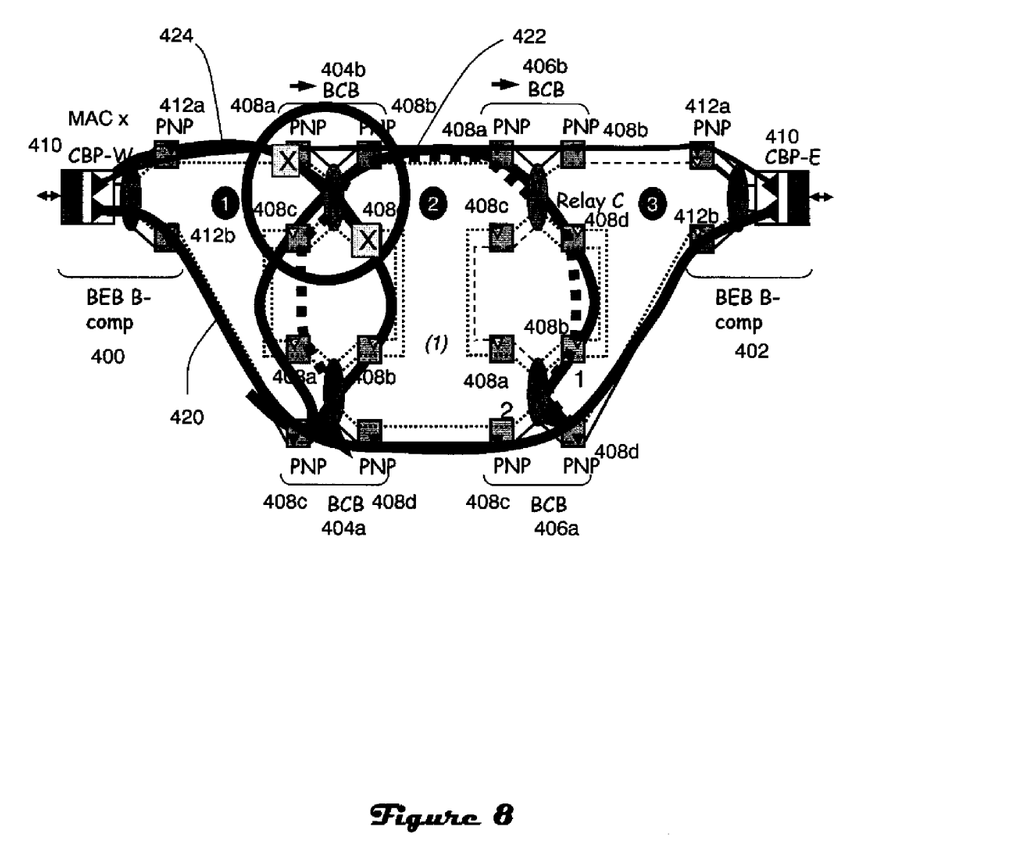
FIG. 8 illustrates a solution to the problem shown in FIG. 7 based on VID swap.

FIG. 8 illustrates another solution to the problem illustrated in FIG. 7. The illustrated solution is based on a VID swap operation. In accordance with this solution, a VID swap is performed across the BCB switch on the section protection path, either from upstream node to buddy node, or from buddy node to downstream node. In the specifically illustrated example the VID swap is performed at PNP 408*a* of BCB 404*b*, and again at PNP 408*d*, such that traffic exiting PNP 408*d* has the same VID as traffic entering PNP 408*a*, but there is no address conflict within BCB 404*b* because the paths are associated with different VIDs. Consequently, a single FDB per VLAN can be maintained in compliance with the Ethernet standard.

Figure 9:
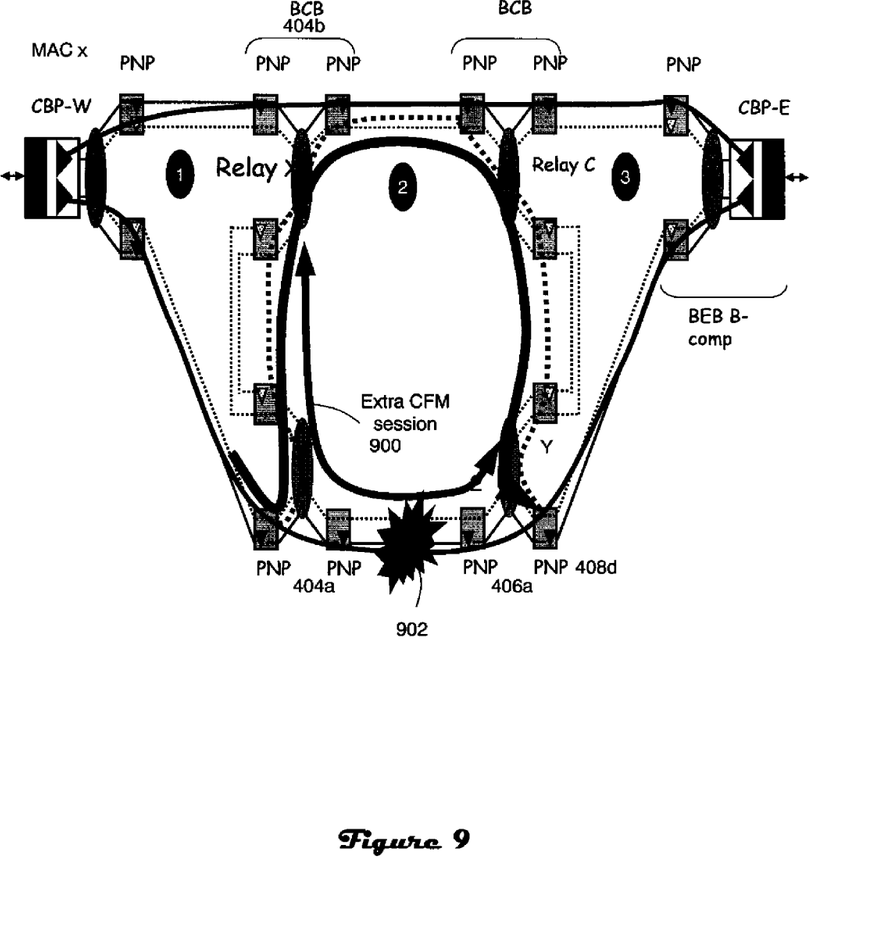
FIGS. 9 and 10 illustrate a sympathetic switch solution to the problem shown in FIG. 7.
Figure 10:
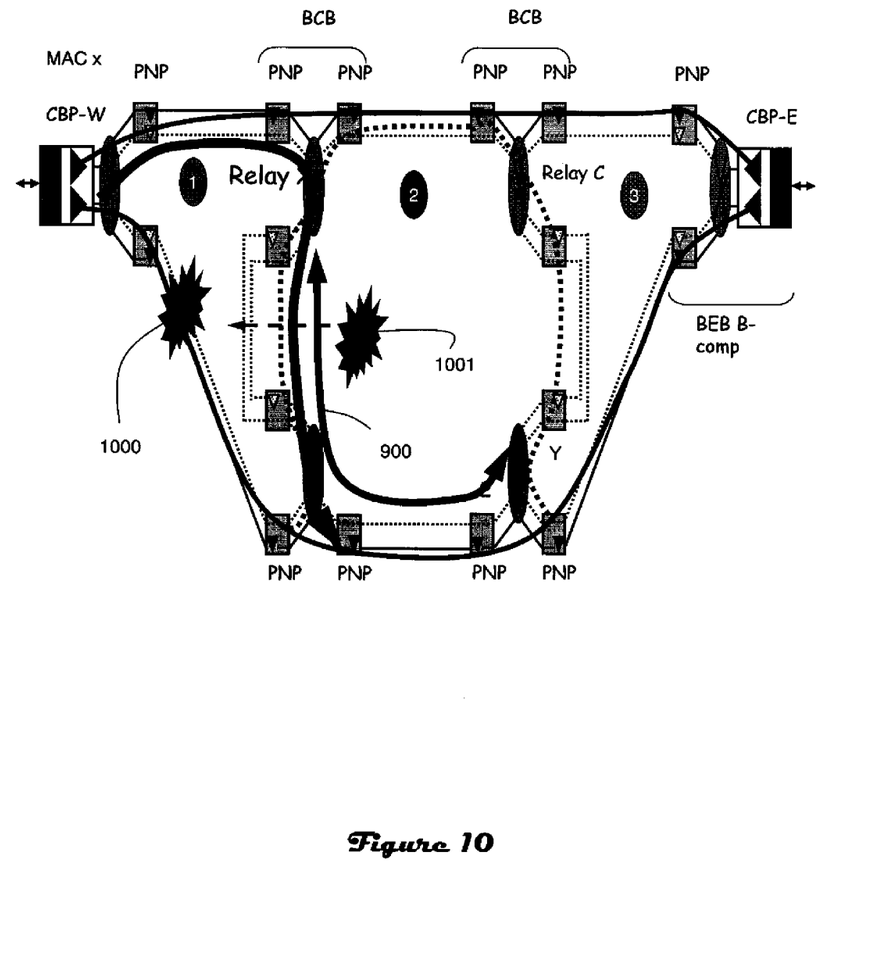

FIGS. 9 and 10 illustrate a further protection switching solution for downstream and upstream faults, respectively, in which extra state, in the form of CFM sessions, is installed on matched nodes, but there is still no explicit synchronization required between pairs of matched nodes such as 404*a* and 404*b*. In this solution additional pairs of CCM sessions (clockwise and counter-clockwise) are maintained between the matched node opening the section protection on the primary e2e path and that closing the protection on the protection e2e path. These "diagonal" sessions between matched nodes allow the upstream matched node on a section protection path to determine directly whether the downstream part of the section protection path, to the section protection closure point, is operational. For example, a diagonal CCM session 900 is maintained between BCB 406*a* and BCB 404*b*. The diagonal sessions allow the network to determine directly whether BCB 404*b* can reach the section closure point at PNP 408*d* of BCB 406*a*. If a fault 902 occurs in the primary path, BCB 404*b* forwards traffic clockwise around the protection path to BCB 406*a*, because the buddy matched node 404*a* has also detected the fault directly from failure of its primary CCM session with BCB 406*a*, and switched traffic onto the section protection path. An upstream fault 1000 will not be detected by CCM session 900 so traffic is forwarded by default (i.e., when CFM session 900 is running correctly) by BCB 404*b* as if primary path on the upstream ring is faulted, i.e., fault 1000 is assumed. Note that the behaviour of BCB 404*b* does not matter in the case of a fault 1001 on the link between the matched nodes, which breaks both paths, because both rings are now faulted, and a subsequent fault on the primary e2e path through both sections can only be recovered by an e2e protection switch.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method comprising:
providing protection in a provider bridge backbone network which includes a first endpoint node which is in communication with a second endpoint node via a plurality of sections, comprising:
in response to a fault in a section of the plurality of sections, determining via first connectivity fault management sessions whether the fault can be overcome with end-to-end protection, and determining via second connectivity fault management sessions whether the fault can be overcome with section protection, wherein a timeout period for the first connectivity fault management sessions is longer than a timeout period for the second connectivity fault management sessions;
utilizing section protection if the fault can be overcome with section protection, where the section includes more than two nodes and is defined between an ingress point and an egress point that do not span the entire provider bridge backbone network from the first endpoint node to the second endpoint node; and
utilizing end-to-end protection that spans the entire provider bridge network from the first endpoint node to the second endpoint node if the fault cannot be overcome with section protection.

2. The method of claim 1 wherein end-to-end protection includes a primary path and a protection path, and section protection includes protection for at least one section of the primary path, and including the step of independently opening and closing section protection for each section on the primary path.

3. The method of claim 1 including the further step of utilizing connectivity fault management sessions to determine the fault status of all paths through a section which are available to all traffic entering and leaving the section of the provider bridge backbone network via first and second nodes of the section.

4. The method of claim 1 wherein section protection is closed on a single matched node of a pair at each end of a section, and including the further step of utilizing section protection without synchronizing the single matched nodes with their corresponding matched nodes.

5. The method of claim 1 including the further step of utilizing a connectivity fault management session between one matched node lying on an end-to-end primary path and another matched node lying on an end-to-end protection path to determine whether connectivity exists between a section protection path and the downstream protection closure point with the corresponding section primary path.

6. The method of claim 5 including, at a node participating in protection of both upstream and downstream sections, placing traffic on a path to the protection closure point of the upstream section or on a path to the protection closure point of the downstream section based on an end-to-end VLAN identifier and the status of downstream sections.

7. The method of claim 1 including enabling at least one node to participate in at least two protection sections without synchronization with other nodes by maintaining a plurality of forwarding databases for the at least one node.

8. The method of claim 1 including, at each section protection opening point, placing frames for a given destination on the primary path through the section or on a protection path through the section based on the fault status of the respective paths and an end-to-end VLAN identifier, without alteration of the VLAN identifier.

9. Apparatus for communicating between endpoints using a provider bridge backbone network which includes a first endpoint node which is in communication with a second endpoint node via a plurality of sections, the apparatus comprising:

an ingress point node and an egress point node which operate together to provide protection for a section of the network that includes more than two nodes and that is defined between the ingress point node and the egress point node, where the section does not span the entire provider bridge backbone network from the first endpoint node to the second endpoint node, the network operating in response to a fault to use first connectivity fault management sessions to determine whether the fault can be overcome with end-to-end protection, and second connectivity fault management sessions to determine whether the fault can be overcome with section protection, and wherein a timeout period for the first connectivity fault management sessions is longer than a timeout period for the second connectivity fault management sessions, and if the fault can be overcome with section protection to utilize the section protection, and to utilize end-to-end protection that spans the entire provider bridge network from the first endpoint node to the second endpoint node via the plurality of sections if the fault cannot be overcome with section protection.

10. The apparatus of claim 9 wherein end-to-end protection includes a primary path and a protection path, and section protection includes protection for at least one section of the primary path, and section protection for each section is independently opened and closed.

11. The apparatus of claim 9 wherein connectivity fault management sessions are utilized to determine the fault status of all paths through a section which are available to all traffic entering and leaving the section of the provider bridge backbone network via first and second nodes of the section.

12. The apparatus of claim 9 wherein section protection is closed on a single matched node of a pair at each end of a section, and wherein section protection is utilized without synchronizing the single matched nodes with their corresponding matched nodes.

13. The apparatus of claim 9 wherein a connectivity fault management session between one matched node lying on an end-to-end primary path and another matched node lying on an end-to-end protection path is used to determine whether connectivity exists between a section protection path and the downstream protection closure point with the corresponding section primary path.

14. The apparatus of claim 13 wherein at a node participating in protection of both upstream and downstream sections, traffic is placed on a path to the protection closure point of the upstream section or on a path to the protection closure point of the downstream section based on an end-to-end VLAN identifier and the status of downstream sections.

15. The apparatus of claim 9 wherein at least one node is enabled to participate in at least two protection sections without synchronization with other nodes by maintaining a plurality of forwarding databases for the at least one node.

16. The apparatus of claim 9 wherein at each section protection opening point frames for a given destination are placed on the primary path through the section or on a protection path through the section based on the fault status of the respective paths and an end-to-end VLAN identifier, without alteration of the VLAN identifier.

* * * * *